US005794645A

United States Patent [19]

Rohrberg et al.

[11] Patent Number: 5,794,645

[45] Date of Patent: Aug. 18, 1998

[54] METHOD FOR SUPPLYING INDUSTRIAL GASES USING INTEGRATED BOTTLE CONTROLLERS

[75] Inventors: Roderick G. Rohrberg; Timothy K. Rohrberg, both of Torrance, Calif.

[73] Assignee: Creative Pathways, Inc., Torrance, Calif.

[21] Appl. No.: 680,769

[22] Filed: Jul. 15, 1996

[51] Int. Cl.$^6$ .................................................. G05D 7/06

[52] U.S. Cl. ........................ 137/15; 137/240; 137/312; 137/557; 251/129.04

[58] Field of Search ........................ 137/15, 240, 312, 137/557; 251/129.04

[56] References Cited

U.S. PATENT DOCUMENTS 3,921,660 11/1975 Kowalski ........................ 251/129.04
4,730,637 3/1988 White ........................ 137/62
4,834,137 5/1989 Kawaguchi et al. ................ 137/312 X
4,989,160 1/1991 Garrett et al. ........................ 222/3 X
5,440,477 8/1995 Rohrberg et al. .................. 137/588 X

*Primary Examiner*—Gerald A. Michalsky
*Attorney, Agent, or Firm*—Anglin & Giaccherini

[57] ABSTRACT

A Method for Supplying Industrial Gases Using Integrated Bottle Controllers that overcomes the problems encountered by previous gas cabinet equipment is disclosed. The present invention comprises a compact and virtually explosion-proof controller (10) that is anchored securely to the top of a standard gas bottle (12). The entire system resides within a housing (11) that sits atop a conventional gas bottle (12) that would normally be enclosed within a gas cabinet (25) that may be sixty times the volume of the present invention. The controller (10) includes a housing (11) that has a top or lid (14), an upper cylinder (16), an annular wall (18) which forms a seal with the bottle (12). In a preferred embodiment of the invention, filled and cleaned bottles are connected to controllers at a fabrication clean area. The controllers are then operated remotely using a radio frequency or infra-red control. After the bottles are depleted, the controllers are removed and tested. The bottles are then refilled for reuse.

9 Claims, 19 Drawing Sheets

SECTION 6-6

METHOD FOR SUPPLYING INDUSTRIAL GASES USING INTEGRATED BOTTLE CONTROLLERS

REFERENCE TO A RELATED U.S. PATENT

The invention described and claimed below is related to earlier inventions disclosed in U.S. Pat. No. 5,440,477 entitled Modular Bottle-Mounted Gas Management System by Roderick G. Rohrberg et al., issued on 8 Aug. 1995.

FIELD OF THE INVENTION

The present invention is a system that provides an intelligent gas control system. The Method for Supplying Industrial Gases Using Integrated Bottle Controllers provides a computerized, compact, explosion-proof and secure source of industrial gases which may be controlled remotely and automatically without the need for much larger, less reliable and expensive gas cabinet equipment.

BACKGROUND OF THE INVENTION

Many industrial processes require equipment that is capable of automatically controlling supplies of gases and fluids. The fabrication of integrated circuits generally includes a process such as chemical vapor deposition in which a variety of heated gases is introduced into a partially evacuated chamber confining a semiconductor substrate. By carefully managing the temperature and pressure within this enclosure, various layers of conductive, insulative, and semiconductive materials are grown on the substrate to create the three-dimensional circuit patterns of an integrated circuit. All of the substances that are transported in and out of the chamber must be constantly monitored, since the proportions of the different reactants that constitute the vapor atmosphere ultimately determine the physical dimensions of the transistors, capacitors, and resistors that will collectively comprise a single, vast electrical circuit on a tiny chip of silicon. One of the greatest causes of failures of finished integrated circuits is attributable to microscopic dust particles that contaminate the workspace where the chip is manufactured. Since even one tiny foreign body can ruin a very expensive chip, semiconductor makers fabricate their products in a "clean room" environment that guards against such contamination. The air which is admitted into a clean room is first passed through an extensive filtration system that virtually eliminates unwanted dust particles. Technicians who work within these facilities wear special clothing and masks that prevent the introduction of substances that would interfere with their meticulous work. The cost of building, maintaining, and operating this highly specialized environment is enormous. Consequently, all the space within a clean room must be utilized as efficiently as possible. All the equipment that is used within the confines of the clean room should occupy as small a volume as possible. In addition to this critical need for miniaturization, the chemicals employed in the vapor deposition method must be housed and conveyed with great care. The solvents, acids, oxidizing agents, and other substances used in the semiconductor laboratory are often caustic or toxic. The devices that are selected to conduct these potentially hazardous materials should be capable of providing reliable service free from wear, corrosion or leakage.

In U.S. Pat. No. 5,440,477, Rohrberg et al. describe a Modular Bottle-Mounted Gas Management System comprising a gas manifold including computer-controlled valves, actuators, regulators and transducers. The entire system resides within a housing that sits atop a conventional gas bottle that would normally be enclosed within a gas cabinet.

In U.S. Pat. No. 4,989,160, Garrett et al. applied modular process control hardware to rather conventional gas control devices, using widely accepted instrumentation and control techniques. While such methods begin to deal with some of the improvements needed in gas management control, they have failed to address many of the design shortcomings of gas management systems.

Gas manifolds in present systems commonly use stainless alloy tubing and mechanical fittings to supply the connections between manifold components, such as valves, regulators and pressure sensors. These complex assemblies of tubing and fittings suffer from a high parts count. The gas manifolds are large and bulky, and the large, internal gas volume results in large purge times, with an excess waste of costly purge gases. The large volumes of potentially hazardous process gases to be purged create safety and disposal problems when the process gases are purged from the system. Tubing and fitting assemblies are also prone to leakage from improper assembly, service or damage during use.

Previous solutions such as those offered by Garrett et al. have also failed to improve upon the safety, cost and extensive down-time for the service of manifolds or controls. These systems are installed integrally within the large gas system containment cabinets. When preventative maintenance, calibration or repair is required, the system cabinet must be taken off line for a prolonged period of time. Service personnel are then required to perform all service tasks with the equipment in position, within the clean-room environment. This is an inefficient environment for equipment service, and can pose safety risks from exposure to process gases during this service interval.

Since the entire manifold and control are integral with the cabinet, the increased risk of contamination to the clean-room area by these non-manufacturing service activities is unavoidable. Should a particular gas cabinet be disabled for a prolonged period, the only way that manufacturing can be resumed in areas that had relied upon that gas management device is if another large and costly gas cabinet has been installed to provide appropriate levels of redundancy.

Previous gas cabinet systems that have been incorporated into chip fabrication systems have served the needs of semiconductor manufacturers adequately, but at a high cost in terms of the great space and volumes that they occupy. The shortcomings of conventional gas control devices has presented a major challenge to designers in the field of industrial controls. The development of a miniaturized, safe, and clean gas management system that provides intelligent automated control for integrated circuit fabrication would constitute a major technological advance. The enhanced performance that could be achieved using such an innovative device would satisfy a long felt need within the computer industry.

SUMMARY OF THE INVENTION

The Method for Supplying Industrial Gases Using Integrated Bottle Controllers disclosed and claimed below is a miniature gas management system that overcomes the problems encountered by previous gas cabinet equipment. The present invention utilizes a compact bottle controller which contains a complete gas manifold that includes computer-controlled valves, actuators, regulators and transducers. The entire system resides within a cylindrical housing that is anchored securely to the top of a conventional gas bottle that would normally be enclosed within a large and voluminous gas cabinet.

The Method for Supplying Industrial Gases Using Integrated Bottle Controllers is a modular unit that is nearly sixty times smaller than previous equipment which is capable of performing equivalent functions. The present invention automatically cycles and directs the flow of process and purge gases to an industrial operation. The greatly diminished volume of the unit reduces the amount of process gas in the system at any given time, compared to the amounts of gas held in much larger conventional gas cabinets. This reduction of total volume keeps the time it takes to evacuate the system at a minimum, and results in a much safer gas management system.

The present invention provides safe handling of toxic, corrosive, and pyrophoric gases in a double-containment vessel. It utilizes component-to-component welds throughout the gas manifold, which allows for the absolute reduction of the size of the manifold while simultaneously reducing the number of mechanical connections. This advanced design delivers unprecedented levels of cleanliness by minimizing the number of particulate traps within the manifold. The invention employs a housing that affords quick and easy installation and modification. This lightweight unit is easy to transport and handle.

In a preferred embodiment of the invention, bottles containing a supply of gas are delivered to a fabrication site. After the bottles are cleaned, they are mated with compact bottle controllers in clean areas. The mated controllers and bottles are then connected to a fabrication process, and the flow of gas from the bottles is monitored by remote control. After the supply of gas is depleted, the controllers are detached from each bottle and tested. The empty bottles are then returned to a vendor for refilling. This method is safer and more reliable than many previous systems, and virtually eliminates down-time.

An appreciation of other aims and objectives of the present invention and a more complete and comprehensive understanding of this invention may be achieved by studying the following description of a preferred embodiment and by referring to the accompanying drawings.

DETAILED DESCRIPTION OF PREFERRED & ALTERNATIVE EMBODIMENTS

Figure 1A:
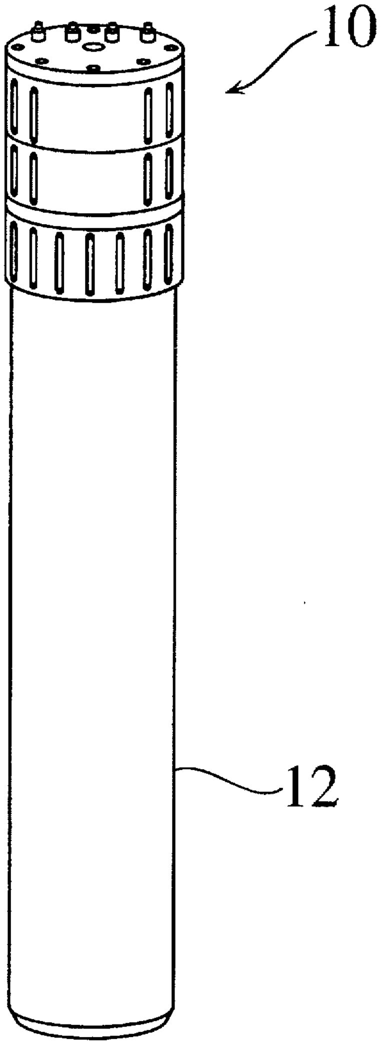
FIG. 1A presents a perspective view of a bottle controller mounted on top of a gas bottle.
Figure 1B:
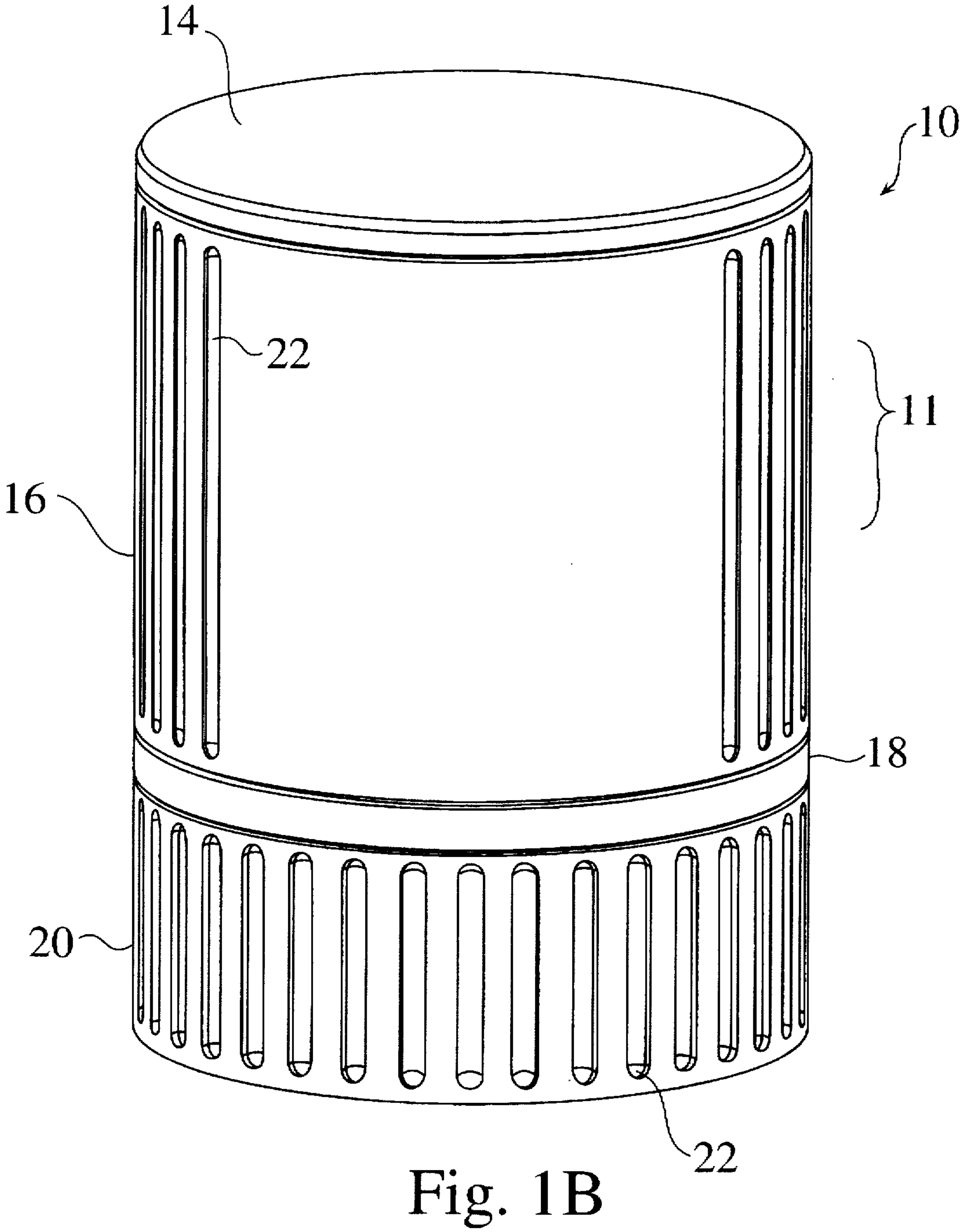
FIG. 1B is a perspective view of the cylindrical controller itself.

FIG. 1A is a perspective view of a compact and miniaturized bottle controller 10 integrated with the top of a standard gas bottle 12. The controller 10 is anchored to a bottle 12 in an extremely strong and secure connection which provides a level of safety that exceeds many conventional gas cabinets. The combination of the controller 10 and the bottle 12 is virtually explosion proof. FIG. 1B is a perspective view of the cylindrical controller 10 without the gas bottle 12. The controller 10 comprises a housing 11 that includes a top or lid 14, an upper cylinder 16, an annular wall 18 which forms a seal with the bottle 12 and a lower cylinder 20. Both the upper cylinder 16 and lower cylinder 18 are characterized by parallel, integrally formed vertical grooves 22.

Figure 2A:
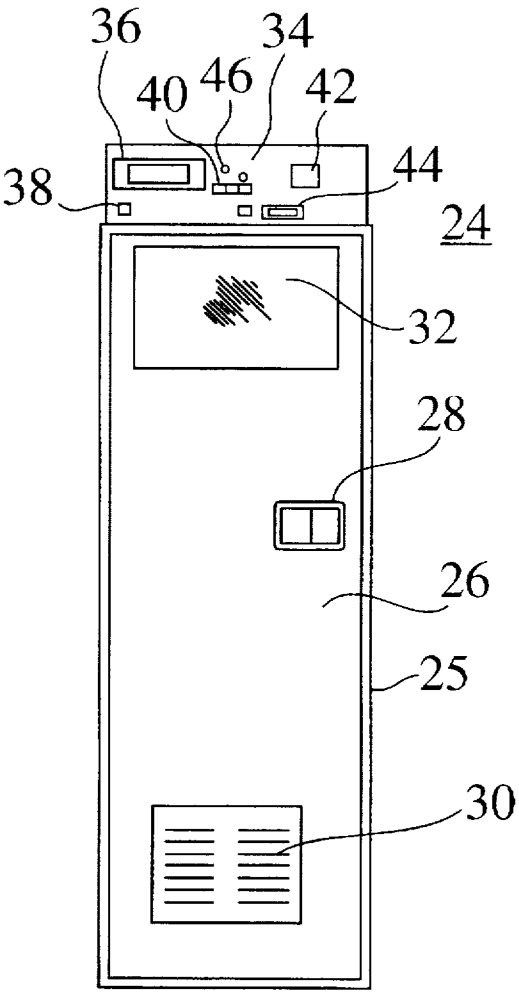
Fig. 2A Prior Art
FIGS. 2A, 2B and 2C provide front, side and interior views of a conventional gas cabinet.
Figure 2B:
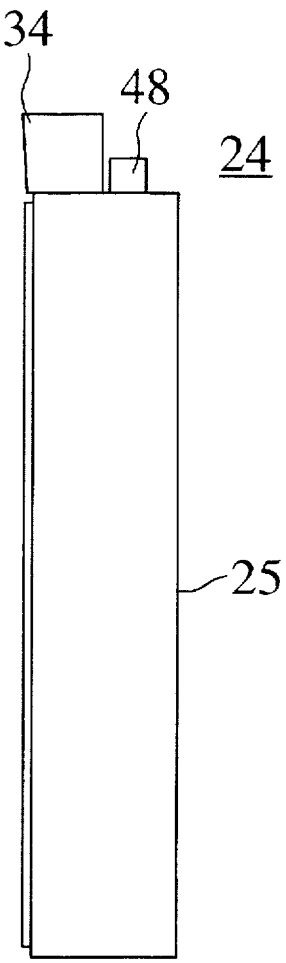
Fig. 2B Prior Art
Figure 2C:
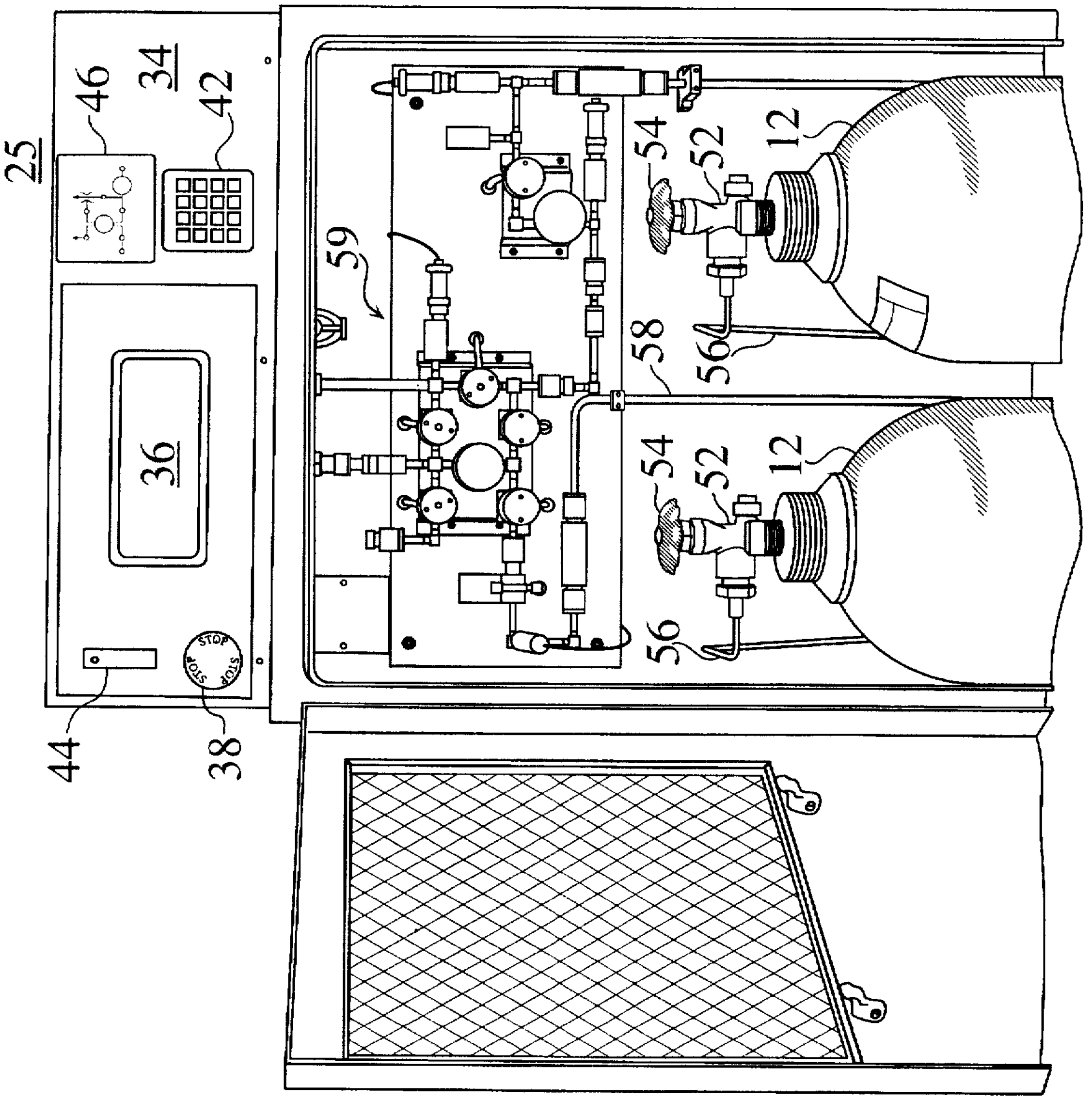
Fig. 2C Prior Art

FIGS. 2A, 2B and 2C present front, side and interior views of a conventional gas cabinet which the present invention replaces. In sharp contrast to the bottle controller 10, which measures approximately seventeen inches high and ten inches in diameter and encloses approximately one-third of a cubic foot of space, the conventional gas management system 24 illustrated in FIGS. 2A, 2B and 2C is roughly seven feet high, three feet wide, and over one foot deep. The gas cabinet consumes over sixty times the volume enclosed by the controller. The older conventional gas management system 24 includes a cabinet housing 25, a hinged door 26, a handle 28, and louvered inlet vents 30 which enable a constant negative pressure to be maintained within the cabinet housing 25. A window 32 affords a view to the hardware and gas bottles 12 contained inside the cabinet housing 25. A conventional control panel 34 includes a standard LCD display screen 36, an emergency stop switch 38, control switches 40, a keypad 42, a data pack 44, and LED indicator lights 46. An outlet vent 48 is mounted on top of the cabinet housing 25 behind the control panel 34.

Located within this conventional gas management system 24 is a large and complex network of valves, sensors, actuators, and transducers, mechanically connected through a manifold system in which to carry out the gas management functions. Construction methods used in these conventional gas management systems 24 rely heavily on mechanical tubing assemblies between manifold components. Such construction systems suffer from a high parts count, and frequently have quality control problems in establishing and preserving leak-proof seals from the mechanical joints.

In the assembly of these mechanical tubing assemblies, it is not uncommon for assembly personnel to reverse internal beveled swage rings or backing rings, or to incorrectly tighten mechanical components, or to incorrectly mix and match coupling hardware with fittings supplied by different manufacturers. Any of these assembly defects can cause process gas leakage from these mechanical joints.

In the manufacture of intermediate tubing joints within a conventional gas management system 24, the use of bending fixtures and cutting jigs can introduce tolerance problems for the tubing components. These inconsistencies in tubing can introduce alignment problems for components in the manifold system. A "stack-up" of tolerances across a manifold assembly employing numerous components, tubing, and mechanical fittings can lead to problems in alignment, making leak-proof assemblies difficult to achieve in practice.

When assembling a large, conventional manifold with numerous components, tubing connections, and mechanical fittings, the tightening of one fitting in the assembly can affect the integrity of other connections within the assembly. This problem can also occur later, when the manifold is in service. Any adjustment, tightening, or movement to the manifold can introduce leakage to portions of the manifold assembly.

FIG. 2C reveals a gas cabinet 25 shown with the cabinet door 26 opened. Two gas bottles 12 which each have a standard bottle neck 52 and a valve handle 54 reside within the cabinet housing 25. An advanced gas manifold assembly 59 is located above the gas bottles 12 within the cabinet 25.

One of the most serious drawbacks of the conventional gas cabinet shown in FIGS. 2A, 2B and 2C is that they require very large squirrel cage fans, pumps and exhaust ducts to vent gases from within the large cabinet. The present invention completely solves this problem by enclosing only a relatively small volume of space immediately above the standard gas bottle 12. Since the present invention does not require a large fan, any scrubber equipment connected to the building where the controller and bottle combination is housed will run at a low duty cycle.

Figure 3:
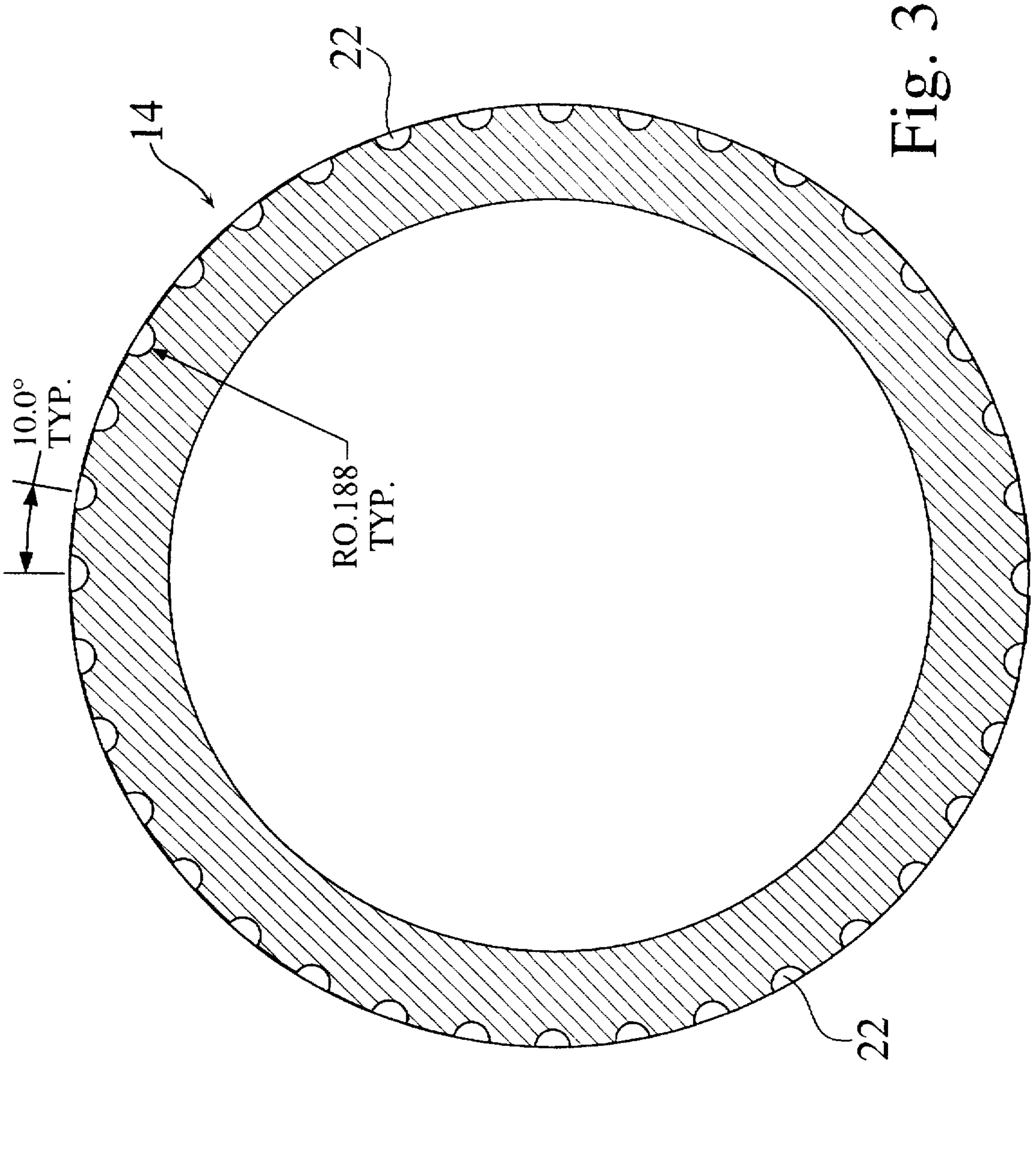
FIG. 3 is a cross-sectional plan view of the housing of the bottle controller.
Figure 4:
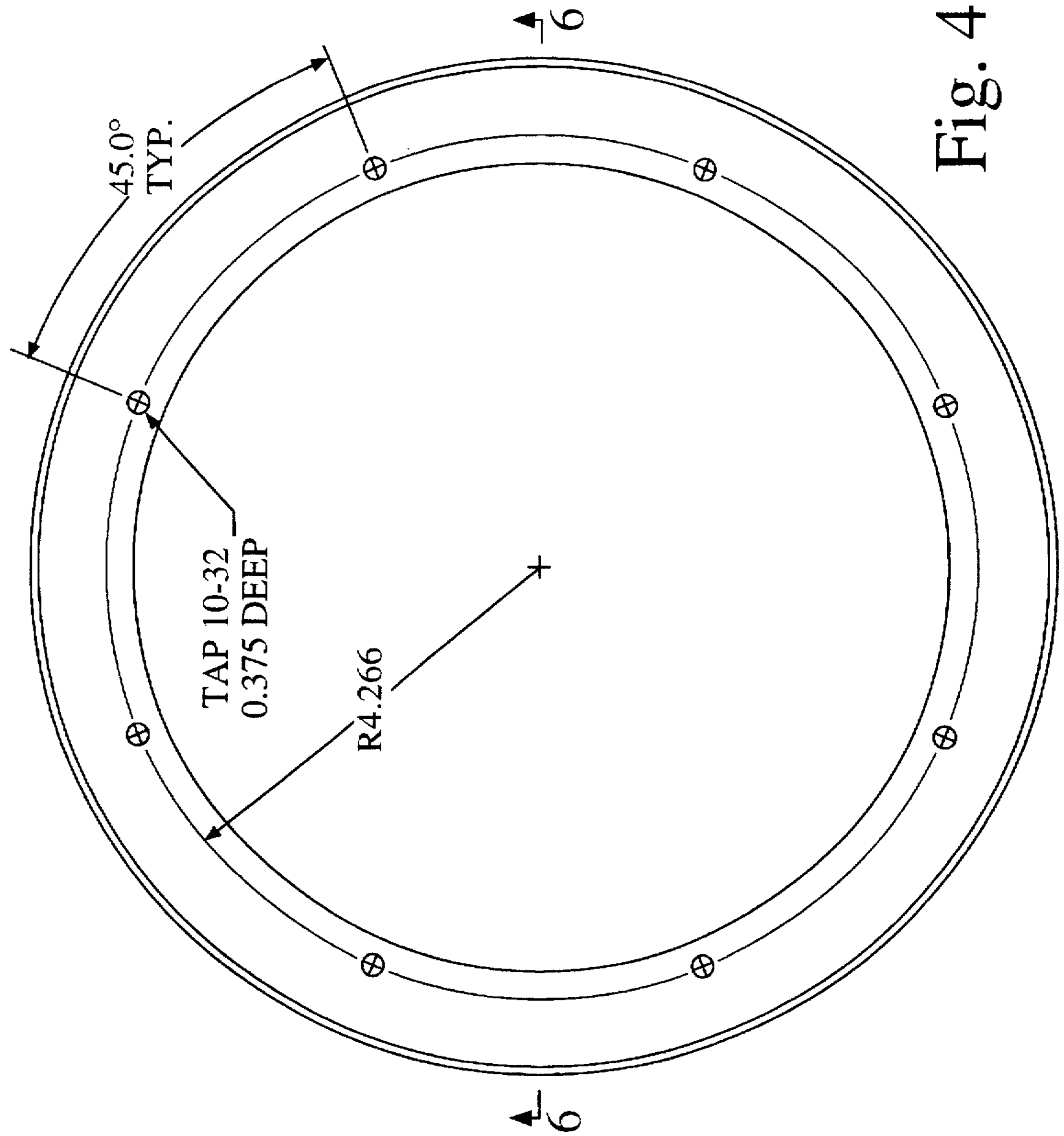
FIGS. 4 and 5 furnish top views of the housing.
Figure 5:
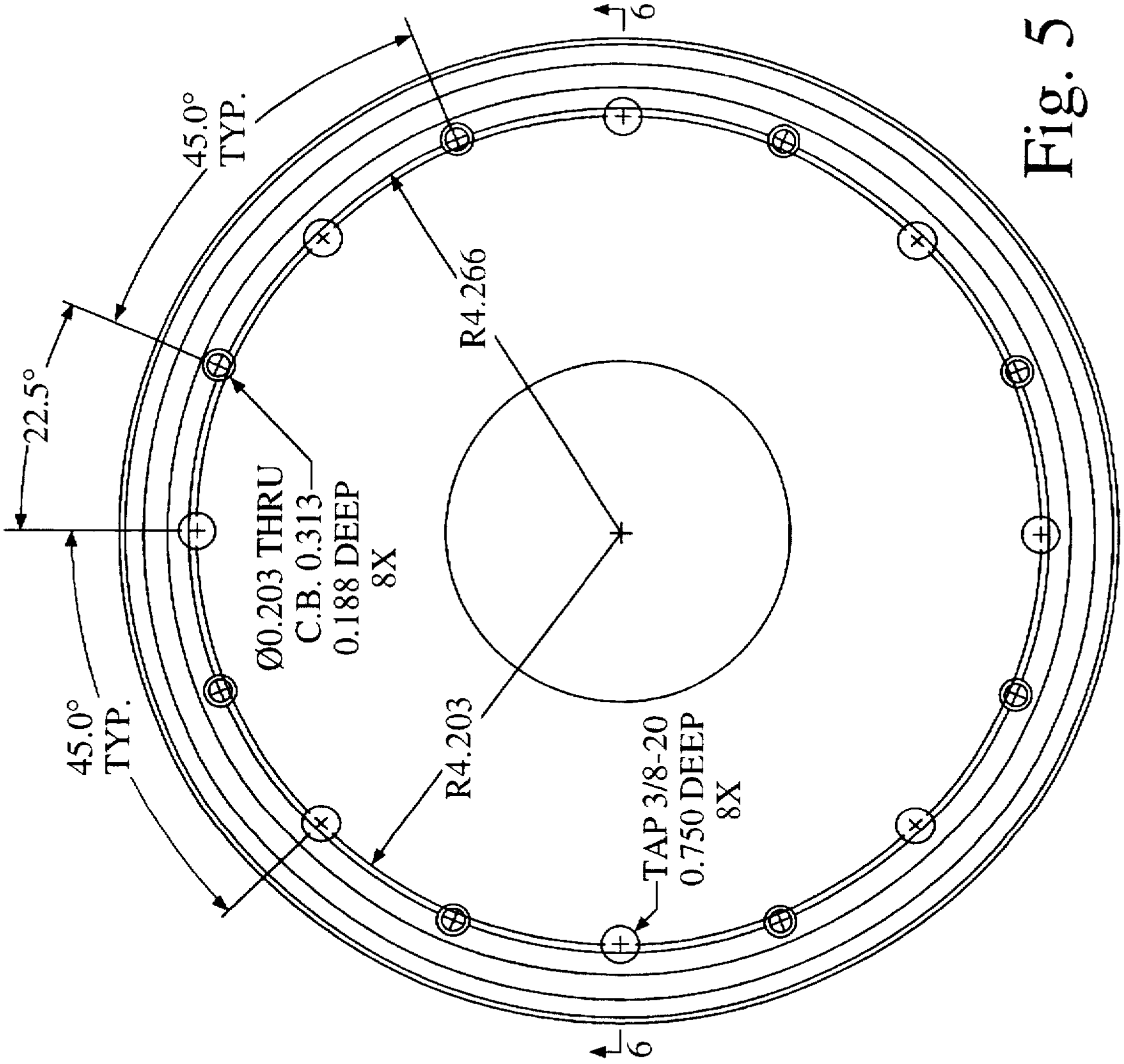

FIG. 3 reveals the top or lid 14 of the housing 11 in cross-section. FIG. 4 is an overhead view of the lid 14. FIG. 5 depicts the annular wall 18 which forms a seal with the bottle 12. The volume of space above the annular wall 18 is referred to as the upper enclosure 19U, while the space below the annular wall 18 is referred to an the lower enclosure 19L.

Figure 6:
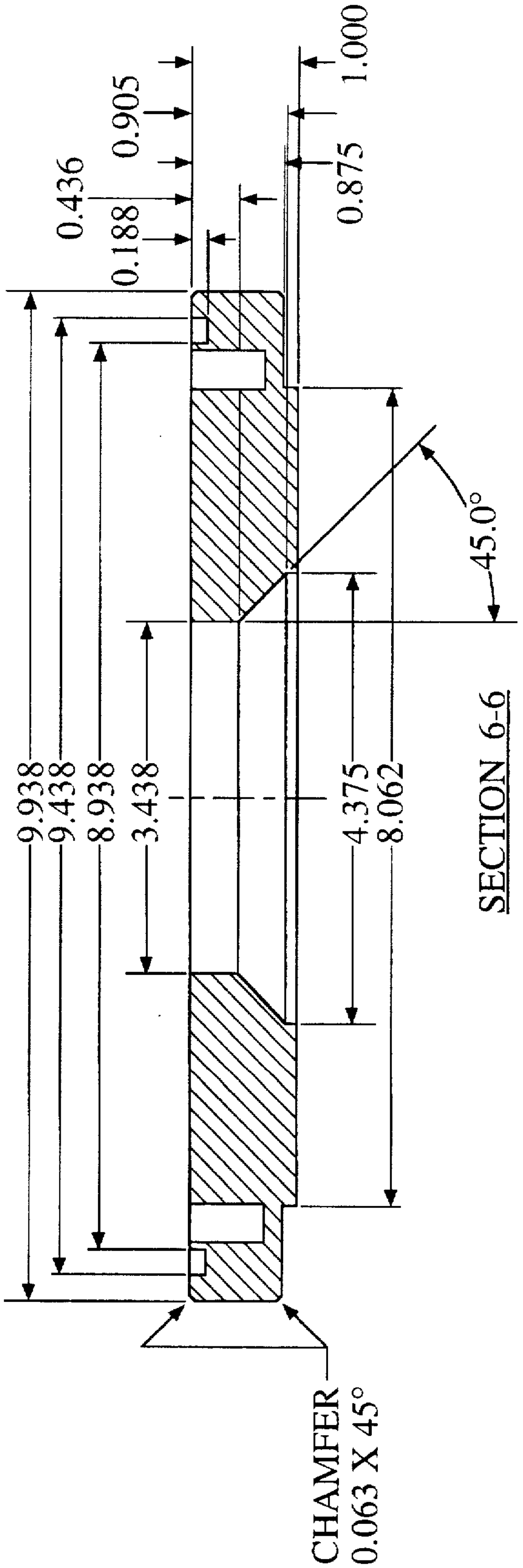
FIGS. 6 and 7 offer sectional views of the housing.
Figure 7:
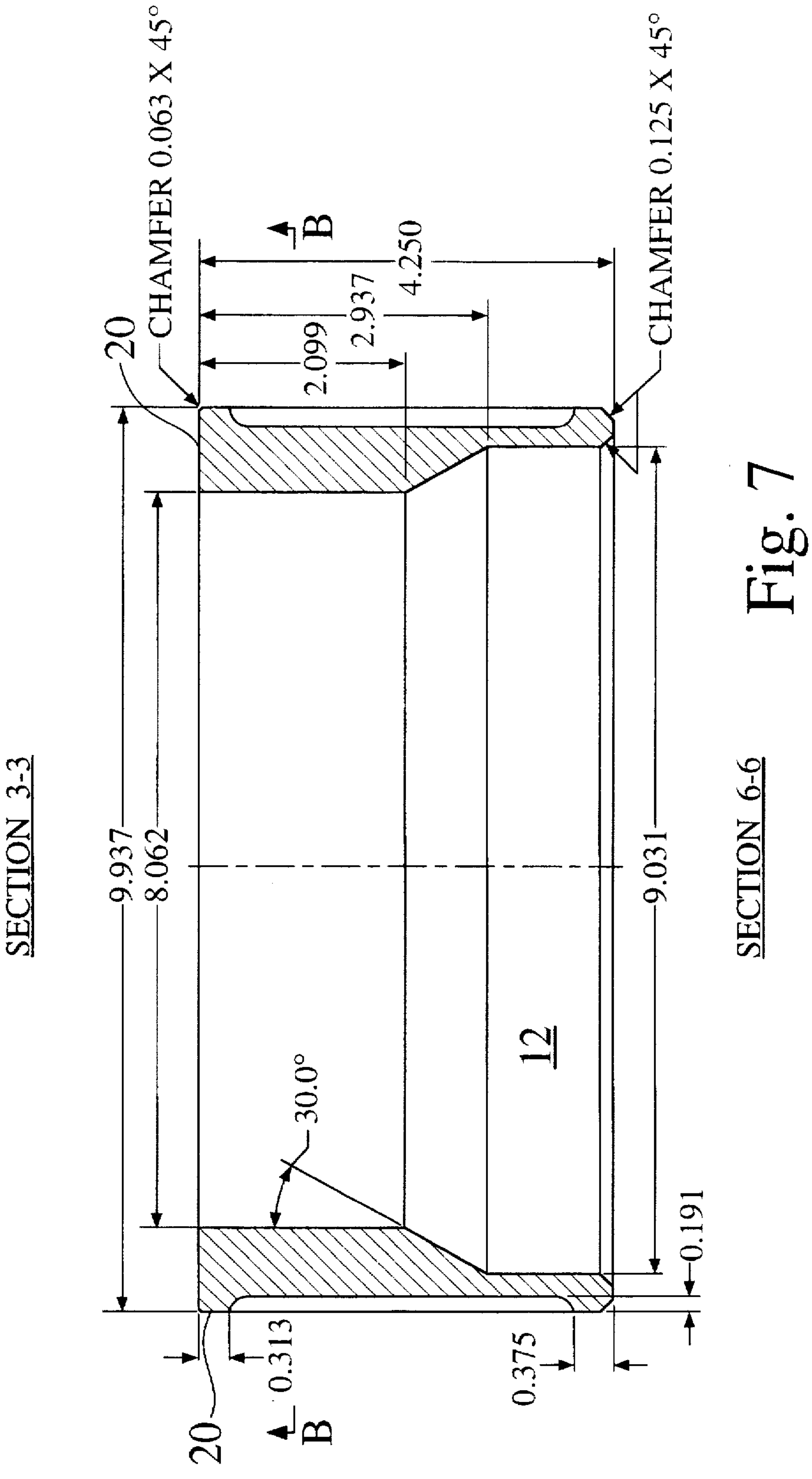

FIG. 6 is a sectional view taken along Section 6—6 in FIG. 5. FIG. 7 is a sectional view of the lower cylinder 20, which functions as a structural skirt that extends below annular wall 18 down to the bottle 12. This feature of the bottle controller 10 makes it as strong or stronger than a bottle with a conventional cap.

Figure 8:
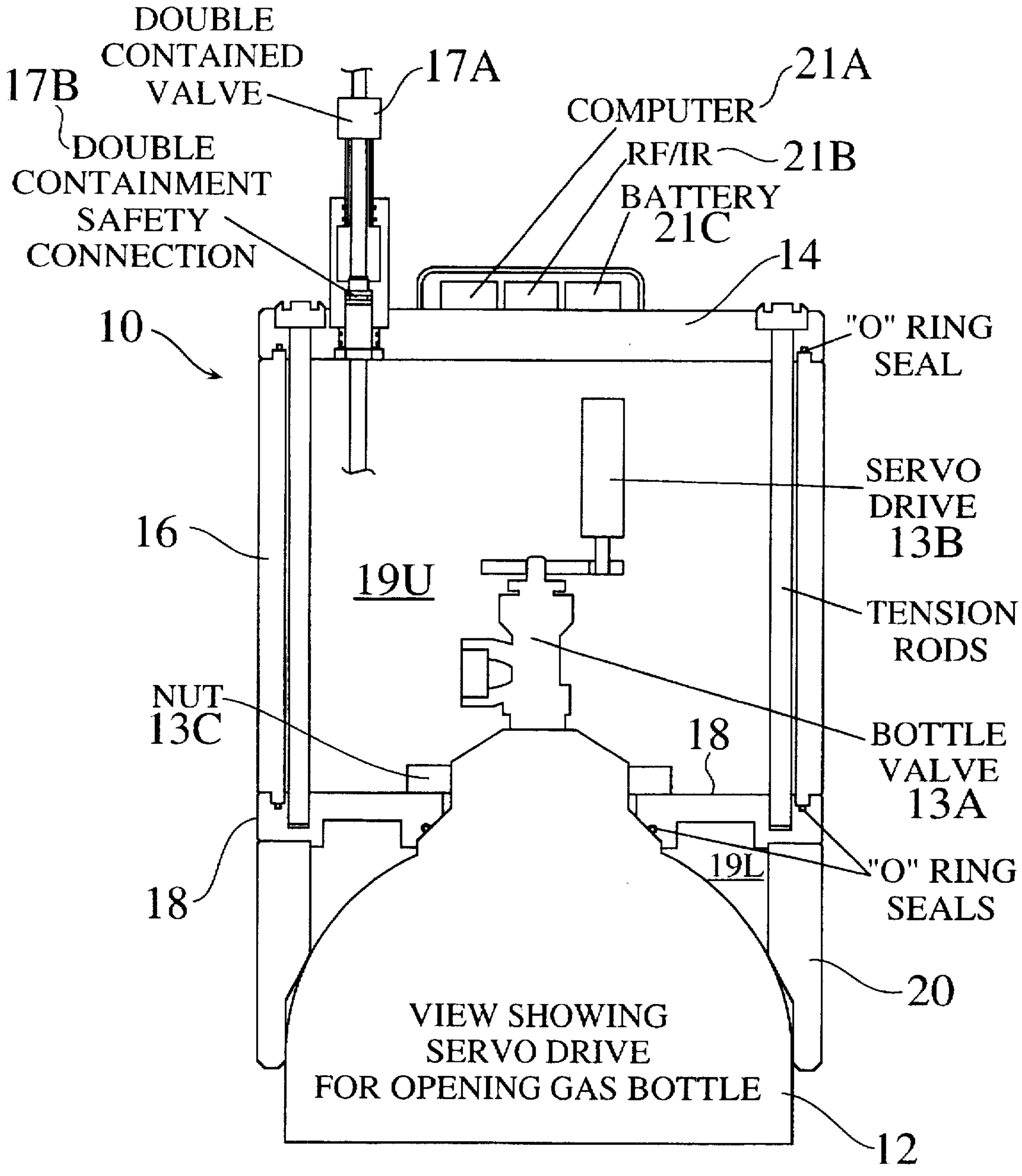
FIG. 8 is a cross-sectional view of a housing mounted on a gas bottle.

FIG. 8 is a cross-sectional diagram which portrays the housing 11 on top of the gas bottle 12. A bottle valve 13A is located at the top of the bottle 12, and a servo drive 13B is coupled to the valve 13A. A nut 13C locks the annular wall 18 down on the shoulders of the bottle 12. A double contained valve 17A extends through the lid 14 into the cavity defined by the upper enclosure 19U through double containment safety connection 17B.

Figure 9:
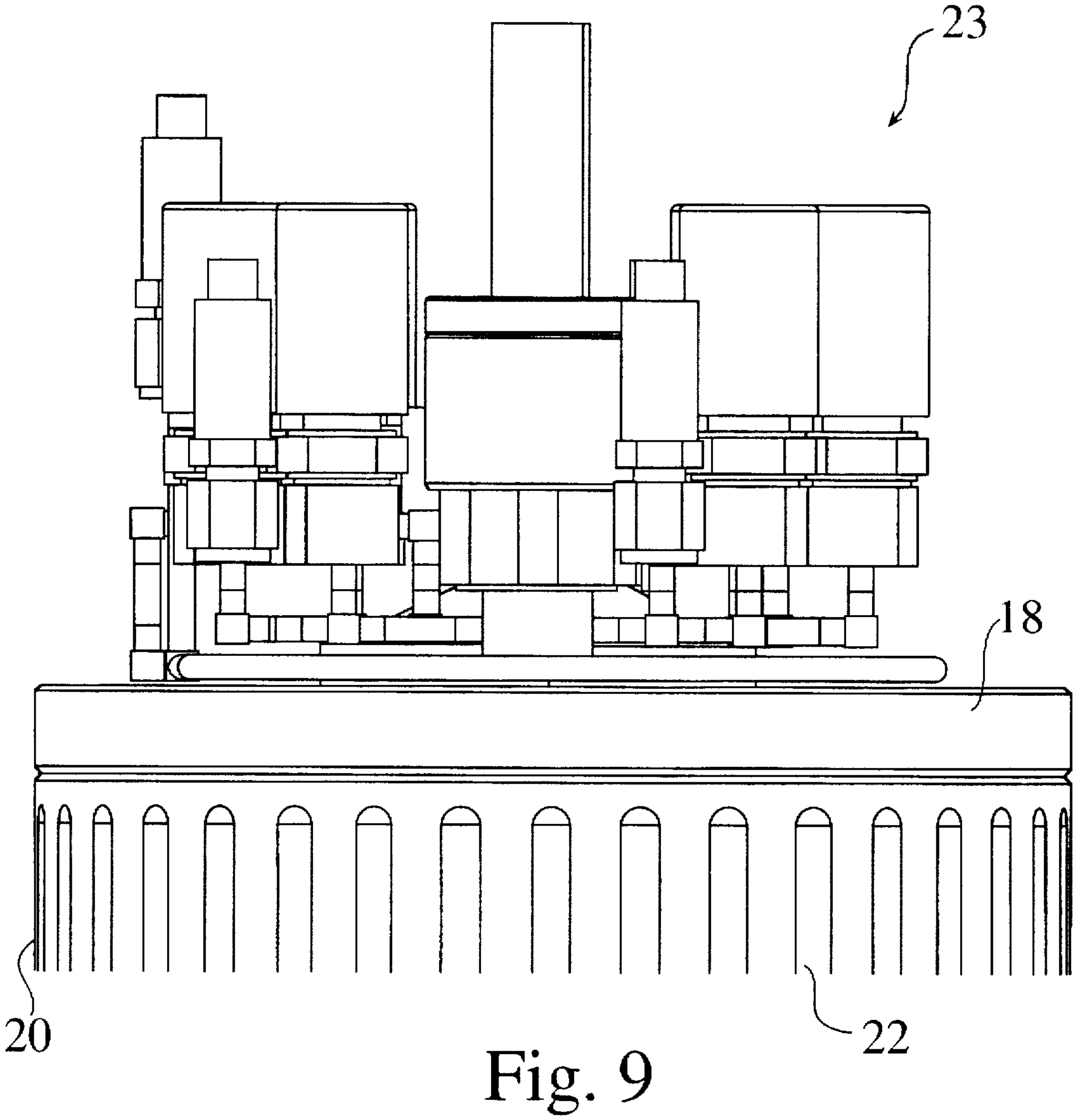
FIGS. 9 and 10 are side views of the gas manifold which resides inside the housing of one of the preferred embodiments of the bottle controller.
Figure 10:
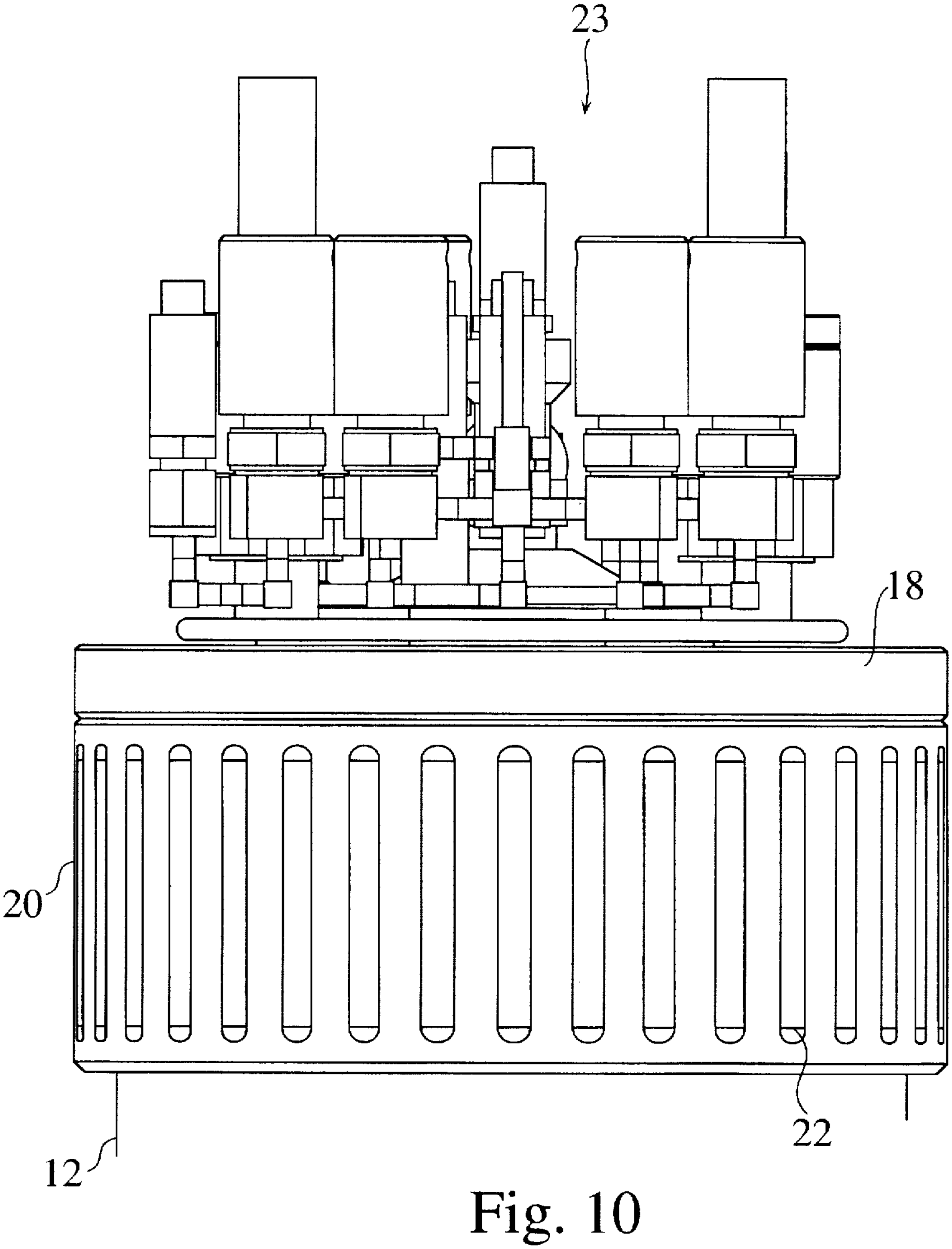
Figure 11:
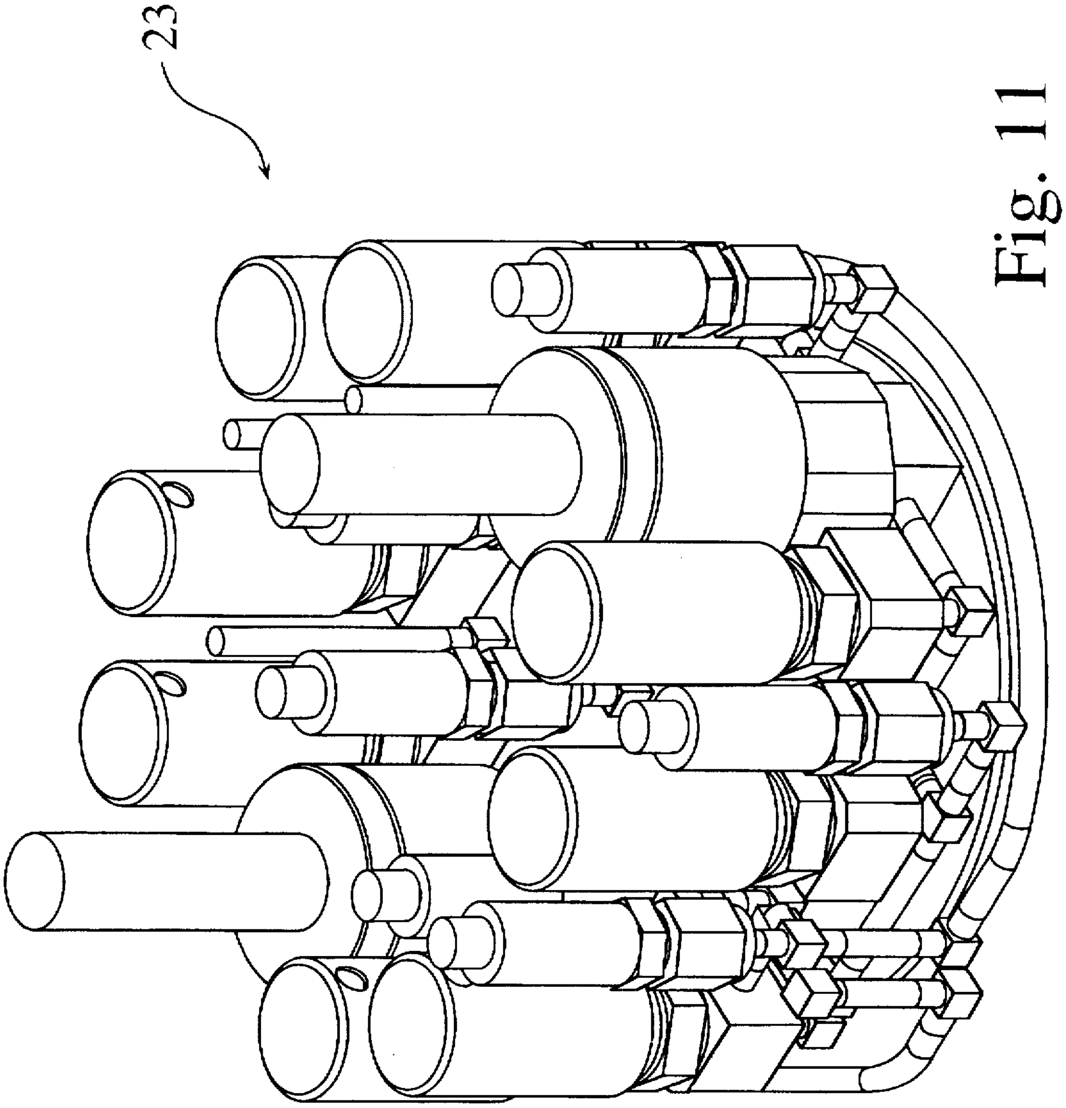
FIG. 11 is a perspective view of the manifold which resides inside the housing of one of the preferred embodiments of the bottle controller.
Figure 12:
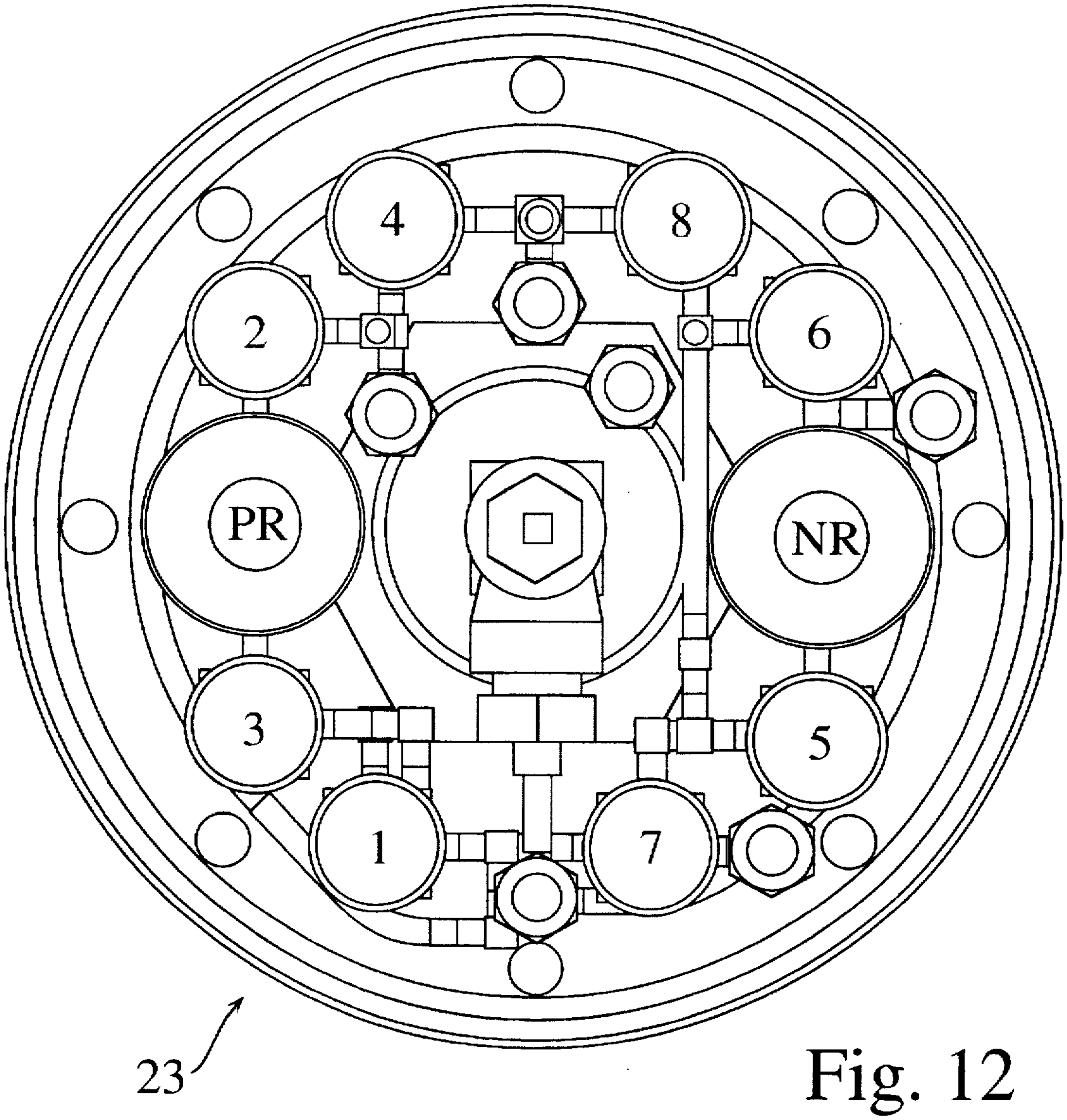
FIG. 12 is an overhead view of components located inside the housing.
Figure 13:
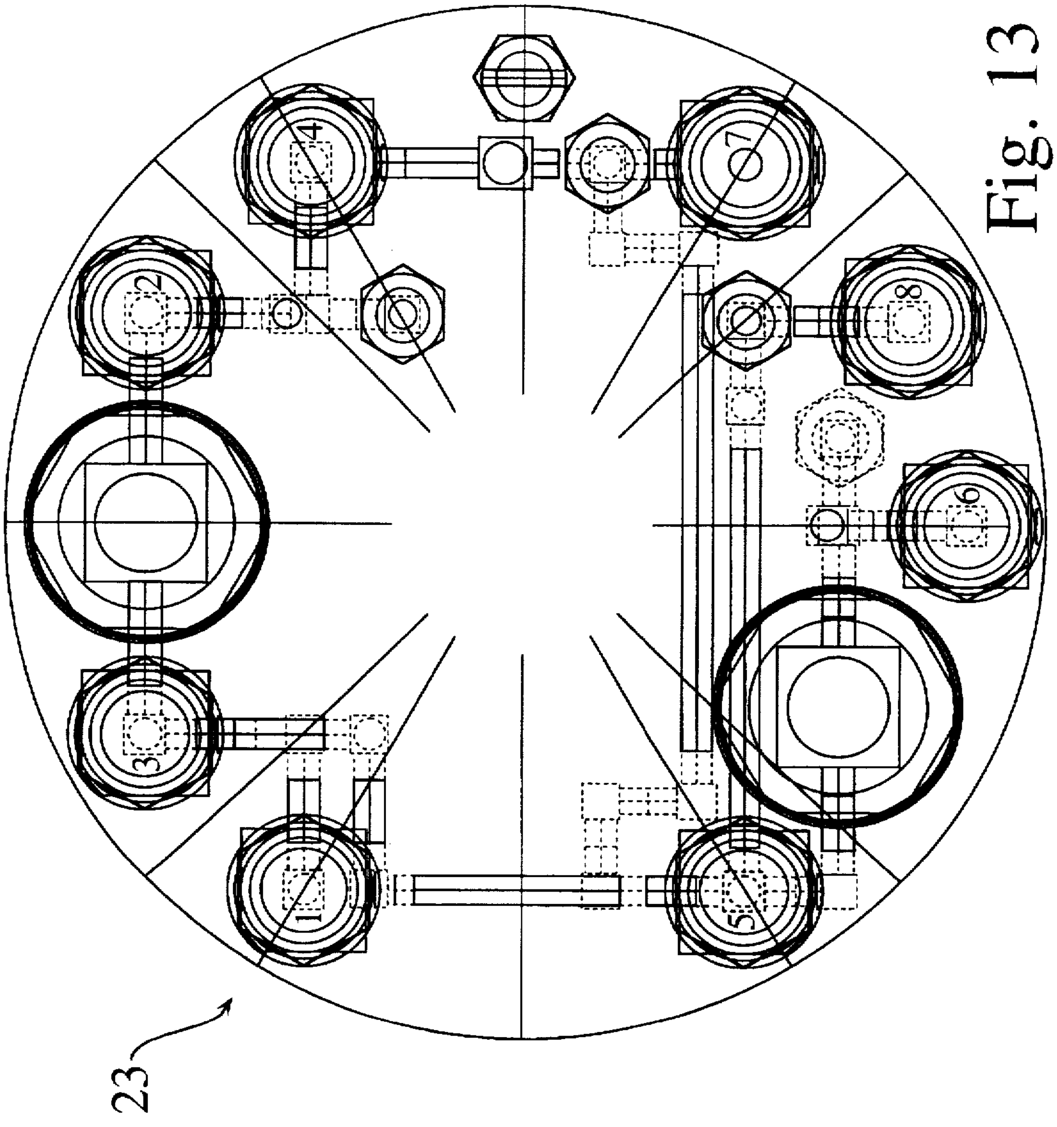
FIG. 13 is a schematic view of components located inside the housing.
Figure 14:
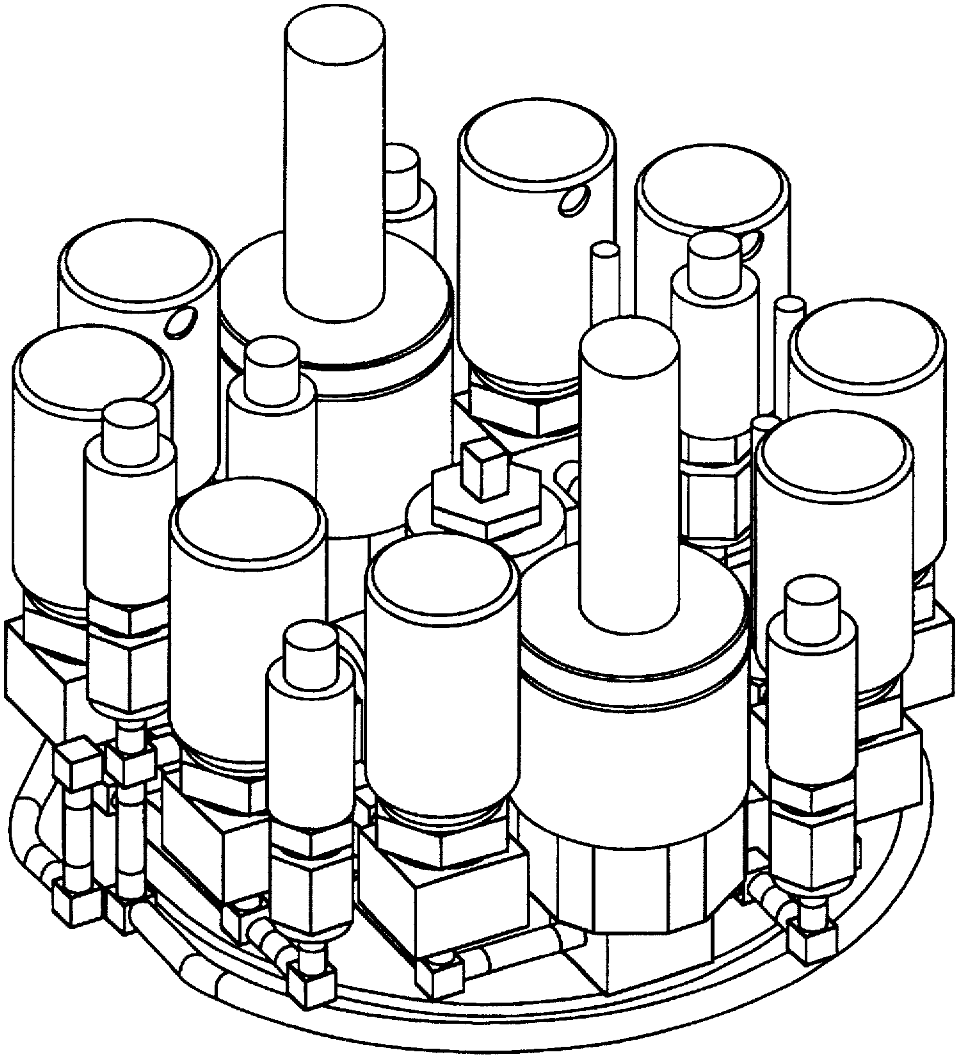
FIGS. 14 and 15 are auto-CAD reproductions of orthographic renderings of the interior and exterior of the housing.
Figure 15:
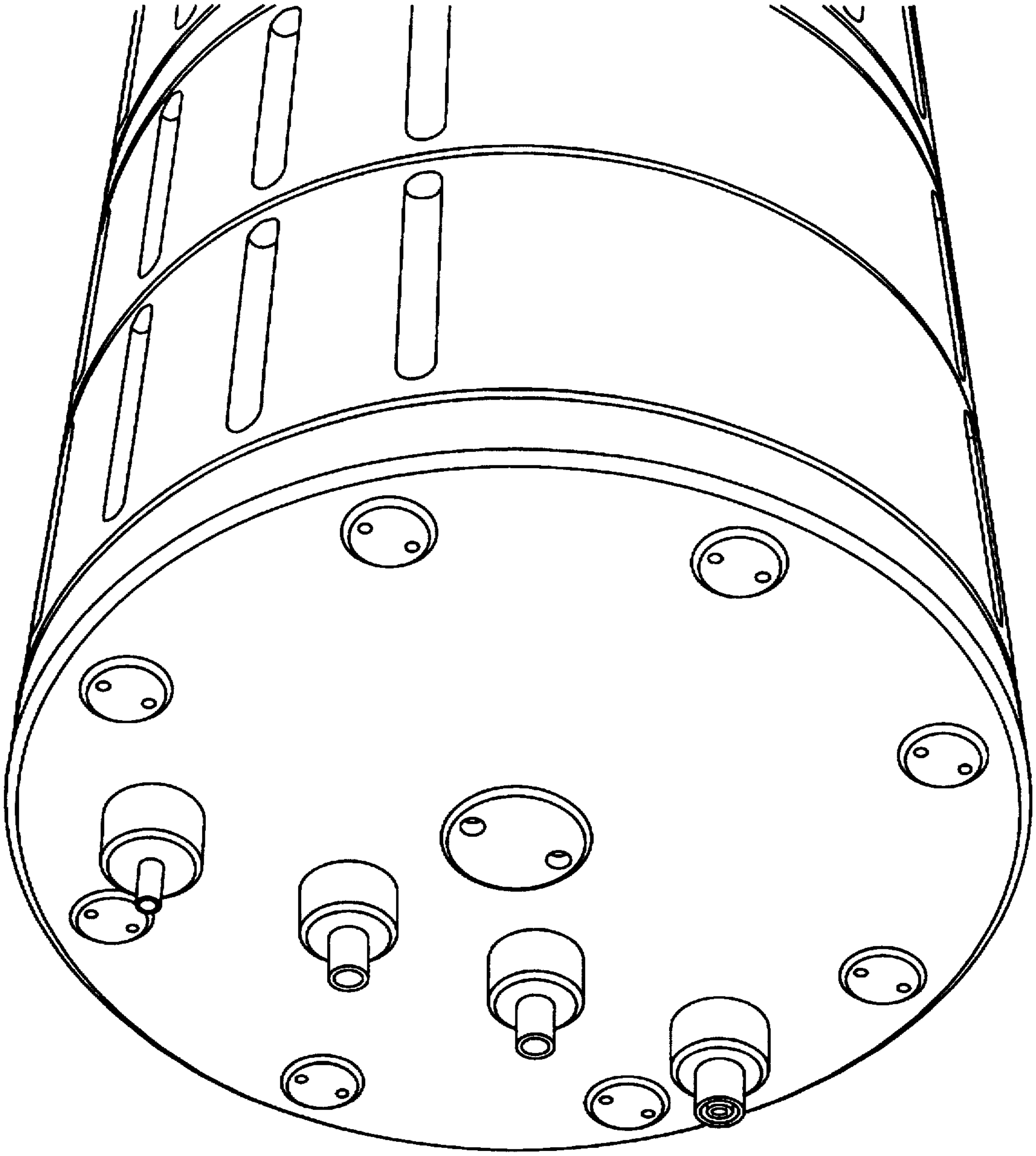
Figure 16:
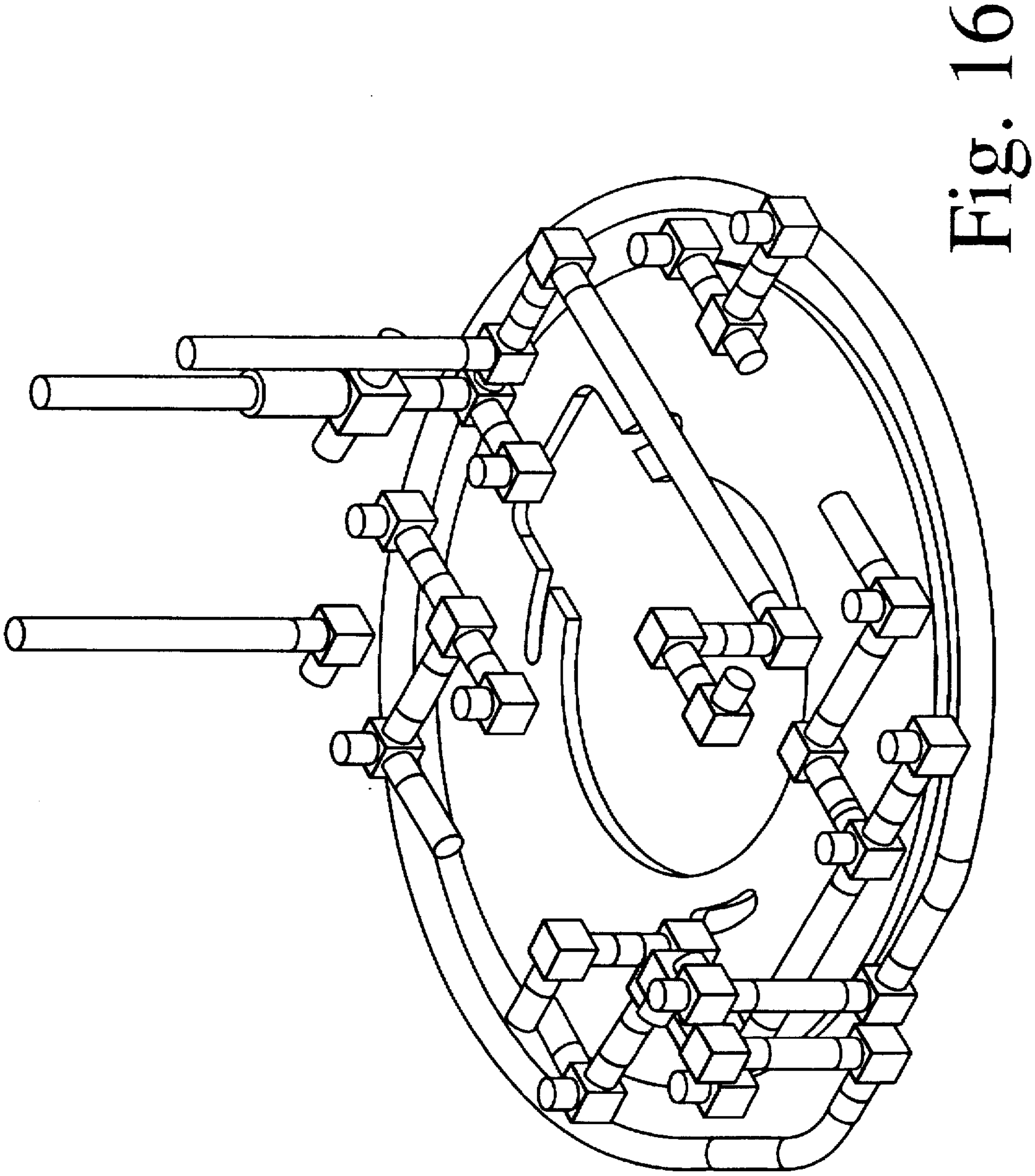
FIG. 16 is a schematic view of connections and fixtures inside the housing.

FIGS. 9 and 10 are side views of the gas manifold 23 which resides inside the upper enclosure 19U on top of the annular wall 18. The manifold 23 includes valves, actuators, pressure sensors, a five-valve purge system and a nitrogen purge system. The pressure regulators in the manifold are servo-controlled. FIG. 11 is a perspective view of the manifold 23, while FIG. 12 is an overhead view. FIG. 13 supplies a schematic view of the valves, actuators and connectors comprising the manifold 23. FIG. 14 offers an auto-CAD reproduction of the manifold 23, and FIG. 15 is a view of the top 14 of the controller 10 showing four fittings for connections to an industrial fabrication site. FIG. 16 is a schematic diagram of connectors and tubing with the manifold 23.

Figure 17:
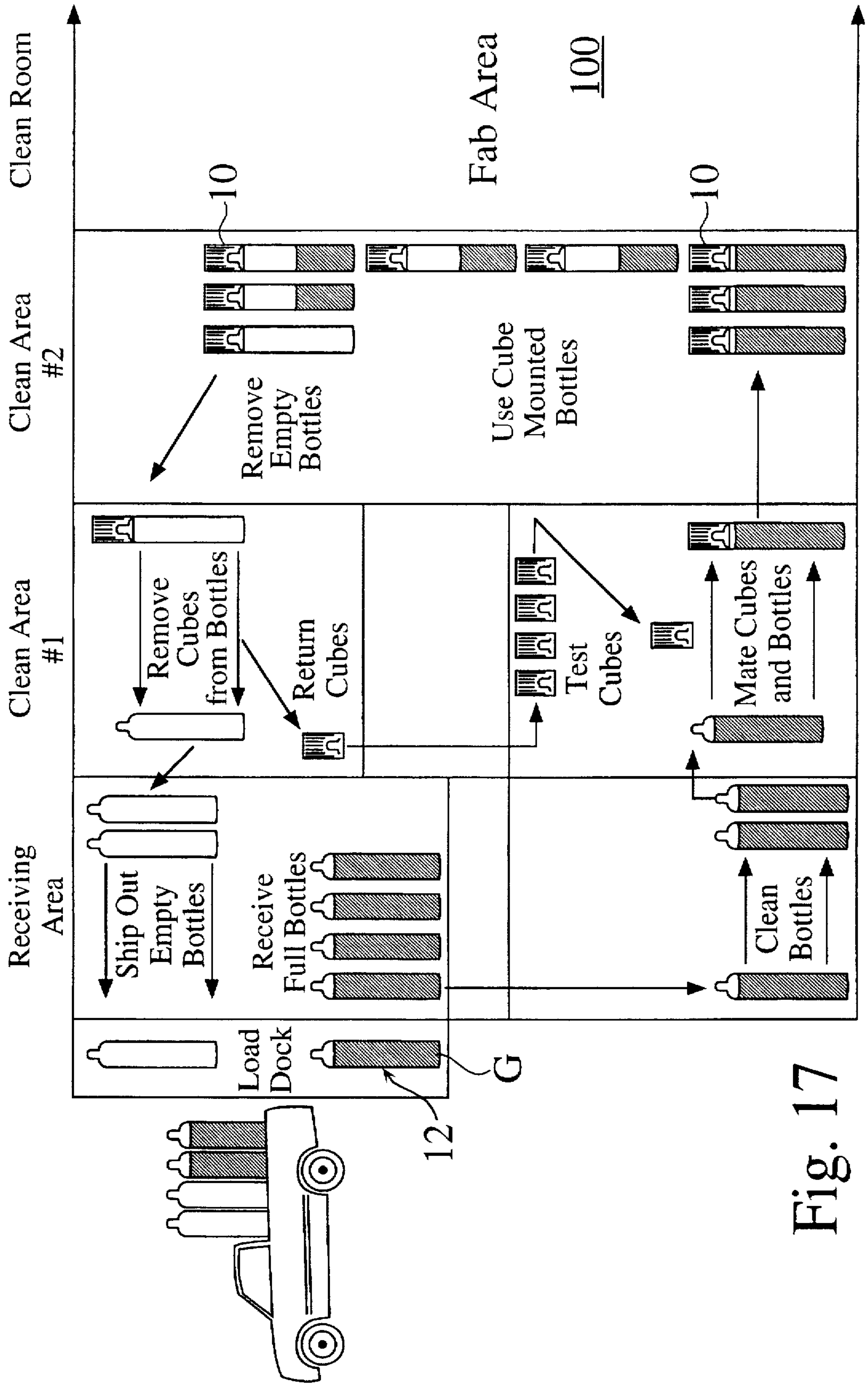
FIG. 17 is a flow chart which depicts one of the preferred embodiments of the method of the present invention.

FIG. 17 is a flow chart 100 that illustrates one of the preferred embodiment of the method of the present invention. Filled gas bottles 12 are transported to an industrial site and are received at a loading dock. After the filled bottles are cleaned, they are mated with bottle controllers 10 in an area which is maintained in a "clean condition"(Clean Area No. 1) by technicians wearing protective clothing. An area that is maintained in a "clean condition" is a space which has an air supply that is continuously filtered to reduce the level of dust and contaminants. In FIG. 17, an area where integrated circuits are fabricated is identified as a "Clean Room". The air in this space is constantly circulated and filtered to produce an extremely low level of contaminants. The present invention has such a small footprint and occupies so little volume that it may be used and assembled inside a Clean Room. The air in Clean Area No. 2 is not as clean as the air in the Clean Room, but has a lower level of airborne contaminants than Clean Area No. 1.

After installation, the supply of gas G is drawn from the mated bottles and controllers. After the supply of gas has been used up, depleted bottles are removed from Clean Area No. 2 back to Clean Area No. 1, where the controllers and bottles are disassembled. The controllers are then tested before they are reconnected to new filled bottles. The expended bottles are then returned to a vendor who refills them with industrial gas. The method of the present invention virtually eliminates downtime for workers at the fabrication site. Many filled, cleaned and mated controller/bottle combinations may be placed near the fabrication site ready to be substituted for any combinations that become empty or that malfunction.

The operation of the controller 10 may be supervised by a technician who is located some distance from the room containing the bottles. Each controller 10 includes a computer 21A and an infra-red or radio-frequency transceiver 21B mounted on top of lid 14. A twelve volt battery 21C is connected to the computer 21A to provide back-up power. An operator in the Clean Room may monitor the flow of gases to the fabrication site on a CRT display using a radio which receives the transmissions from the bottle controller. The transmission may include data from pressure transducers inside the housing concerning the flow of process gas, nitrogen or enclosure pressure. In an alternative embodiment of the invention, bottles with controllers may be arranged in an arc or circular array and may be interrogated by a scanning infra-red sensor or radio controller.

If too much pressure builds up inside the housing, an automatic discharge pressure transducer in the manifold opens a valve and vents the excess gas to the environment outside the housing. After the vent valve closes, the chamber is then purged with nitrogen. Pressure sensors in the manifold can also issue a warning if a leak is detected. Any leakage into the housing can be diluted by nitrogen by the action of a valve in the manifold. The computer 21A may be programmed to purge the cavity 19U on some regular schedule, and also to shut down the controller in the event of an emergency. Fittings that protrude through the top of the housing for connection to the fabrication process can be color-coded for easy use and identification.

CONCLUSION

Although the present invention was designed for use in the semiconductor fabrication business, the Method for Supplying Industrial Gases Using Integrated Bottle Controllers may be employed in a great number of industrial settings. As factory engineers and technicians seek better ways to manufacture products that require safe, reliable, and intelligent gas management systems, they will look to the technology and quality leaders who create innovative solutions that break through the barriers imposed by conventional equipment. The Method for Supplying Industrial Gases Using Integrated Bottle Controllers is just such an innovative solution that will revolutionize the gas management field for both giant semiconductor fabricators and small welding shops.

Although the present invention has been described in detail with reference to a particular preferred embodiment, persons possessing ordinary skill in the art to which this invention pertains will appreciate that various modifications and enhancements may be made without departing from the spirit and scope of the claims that follow. The various gases and mechanical arrangements that have been disclosed above are intended to educate the reader about various preferred and alternative embodiments, and are not intended to constrain the limits of the invention or the scope of the claims. The List of Reference Characters which follows is intended to provide the reader with a convenient means of identifying elements of the invention in the Specification and Drawings. This list is not intended to delineate or narrow the scope of the claims.

LIST OF REFERENCE CHARACTERS

10 Bottle controller
11 Housing
12 Gas bottle
13A Bottle valve
13B Servo drive
13C Nut
14 Top of housing
16 Upper cylinder
17A Double contained valve
17B Double containment safety connection
18 Annular wall
19U Upper enclosure
19L Lower enclosure
20 Lower cylinder
21A Computer
21B Radio frequency or infra-red transceiver
21C Battery backup
22 Grooves
23 Gas manifold
24 Conventional gas management system
25 Cabinet housing
26 Hinged door
28 Handle
30 Negative pressure inlet louvers
32 Window
34 Conventional control panel
36 Standard LCD display screen
38 Emergency stop switch
40 Control switches
42 Keypad
44 Data pack
46 LED indicator lights
48 Outlet vent
52 Bottle neck
54 Valve handle
56 Lower section of process gas line
58 Upper portion of process gas line
59 Advanced gas manifold assembly
100 Flow chart illustrating methods of the invention

What is claimed is:

1. A method of supplying an industrial gas comprising the steps of:

providing a bottle controller (10) mounted directly on the top of a gas bottle (12); said gas bottle (12) having a supply of said industrial gas (G); said bottle controller (10) having a housing (11); said housing (11) being adapted to form a seal around the top of said gas bottle (12); said housing (11) including a gas manifold (27); said housing (11) adapted to be able to be evacuated and pressurized;

said gas manifold (23) including an automatic discharge pressure transducer which senses pressure inside said housing (11) and which automatically vents excess gas and generates an alarm; and said housing (11) including a double contained valve (17A) and a double containment safety connection (17B) to provide a housing which is substantially explosion proof;

connecting said bottle controller (10) to a fabrication process input;

controlling the use of said supply of said industrial gas (G) remotely; and removing said bottle controller (10) from said fabrication process input.

2. A method of supplying an industrial gas comprising the steps of:

attaching a bottle controller (10) directly on the top of a gas bottle (12); said gas bottle having a supply of said industrial gas (G); said bottle controller (10) having a housing (11); said housing (11) being adapted to form a seal around the top of said gas bottle (12); said housing (11) including a gas manifold (23);

said housing (11) adapted to be able to be evacuated and pressurized;

said gas manifold (23) including automatic discharge pressure transducer which senses pressure inside said housing (11) and which automatically vents excess gas and generates an alarm; and said housing (11) including a double contained valve (17A) and a double containment safety connection (17B) to provide a housing which is substantially explosion proof;

connecting said bottle controller (10) to a fabrication process input;

controlling the use of said supply of said industrial gas (G) remotely;

removing said bottle controller (10) from said fabrication process input; and removing said bottle controller (10) from said gas bottle (12).

3. A method as recited in claim 2, in which:

said bottle controller (10) is tested after it is removed from said gas bottle (12).

4. A method as recited in claim 2, in which:

said gas bottle (12) is cleaned before it is attached to said bottle controller (10).

5. A method as recited in claim 2, in which:

said gas bottle (12) is refilled after it is removed from said bottle controller (10).

6. A method as recited in claim 2, in which:

said bottle controller (10) does not require a circulating fan.

7. A method as recited in claim 2, in which:

said bottle controller (10) includes a transceiver (21B) for remote control.

8. A method as recited in claim 2, in which:

said housing (11) includes a top (14) and a computer 21A located on top of said top (14).

9. A method as recited in claim 2, in which:

said housing (11) includes a battery-backup (21C).

* * * * *